(12) United States Patent
Marinovic et al.

(10) Patent No.: US 10,511,938 B1
(45) Date of Patent: Dec. 17, 2019

(54) SYSTEMS AND METHODS FOR LOCATING OR TRACKING DEVICES USING PROXIMAL GROUPINGS OF DEVICES

(71) Applicant: THE WIRELESS REGISTRY, INC., Washington, DC (US)

(72) Inventors: Srdjan Marinovic, Washington, DC (US); Eric Stanculescu, Washington, DC (US); Stillman Bradish, Washington, DC (US)

(73) Assignee: The Wireless Registry, Inc., Washington, DC (US)

( * ) Notice: Subject to any disclaimer, the term of this patent is extended or adjusted under 35 U.S.C. 154(b) by 0 days.

(21) Appl. No.: 16/124,042

(22) Filed: Sep. 6, 2018

Related U.S. Application Data

(60) Provisional application No. 62/727,871, filed on Sep. 6, 2018, provisional application No. 62/702,231, filed on Jul. 23, 2018, provisional application No. 62/692,113, filed on Jun. 29, 2018.

(51) Int. Cl.
*H04W 24/00* (2009.01)
*H04W 4/029* (2018.01)
*H04W 4/021* (2018.01)
*H04W 4/02* (2018.01)

(52) U.S. Cl.
CPC ............ *H04W 4/029* (2018.02); *H04W 4/021* (2013.01); *H04W 4/023* (2013.01)

(58) Field of Classification Search
None
See application file for complete search history.

(56) References Cited

U.S. PATENT DOCUMENTS

| | | | |
|---|---|---|---|
| 2008/0139114 A1* | 6/2008 | Ranganathan | H04B 5/0062 455/41.1 |
| 2015/0133162 A1* | 5/2015 | Meredith | H04W 64/00 455/456.3 |
| 2016/0078738 A1* | 3/2016 | Basalamah | H04W 4/029 340/8.1 |

* cited by examiner

*Primary Examiner* — Erika A Washington
(74) *Attorney, Agent, or Firm* — Eric L. Sophir; Dentons US LLP

(57) ABSTRACT

Disclosed herein are embodiments of systems, methods, and products comprise an analytic server, which tracks and locates electronic devices (e.g., wireless devices and devices enabled with wireless transmitters). The analytic server monitors wireless signals detected by different observer devices at different time points. The analytic server analyzes the wireless signals to build signal graph and generate hyperclusters. When the analytic server receives a request of finding a lost/missing device, the analytic server receives observations from observer devices that detect the wireless signals from the missing device, determine signal context (e.g., hypercluster) and geolocation of the missing device based on observations from observer devices, performs resolution to narrow down the geolocation. The analytic server also combats different forms of active attacks. The analytic server generates a graphical user interface comprising the location information of the missing device.

20 Claims, 7 Drawing Sheets

SYSTEMS AND METHODS FOR LOCATING OR TRACKING DEVICES USING PROXIMAL GROUPINGS OF DEVICES

CROSS REFERENCE TO RELATED APPLICATIONS

This application claims priority to U.S. Provisional Patent Application No. 62/702,231, filed on Jul. 23, 2018; U.S. Provisional Patent Application No. 62/692,113, filed on Jun. 29, 2018; and U.S. Provisional Patent Application No. 62/727,871, filed Sep. 6, 2018, all of which are hereby incorporated by reference in their entirety.

TECHNICAL FIELD

This application relates generally to methods and systems for tracking and locating electronic devices, such as wireless devices and other devices enabled with wireless transmitters.

BACKGROUND

Manufacturers and companies provide various solutions for finding a lost device. However, these conventional solutions may have several technical shortcomings. Specifically, a conventional solution for locating a device may require hardware from a particular manufacturer or a specific application, such as a particular operating system. For example, Google may provide the service of finding an Android phone, but not an iPhone. In another example, the conventional solution may require additional hardware, such as a tracker, attached to the device.

Additionally, the conventional solutions may not provide the ability to avoid an active attack. A conventional solution may detect a lost device and report its geolocation. However, in an active attack, someone who steals a device may try to fake or spoof the geolocation of the lost device and/or manipulate the signal environment around the lost device. In such cases, the conventional solutions may fail to find the lost device or provide the wrong location of the lost device.

Furthermore, the conventional solutions may be less accurate. A conventional solution may report the geolocation of a lost device, but the geolocation may be not sufficient for tall buildings. For example, the geolocation may only provide the location of a tall building and suggest that the lost device is located in the tall building. When the building has many floors, the geolocation may not be sufficient to identify the specific location of the lost device.

SUMMARY

What is therefore desired are systems and methods that are not tied to any specific hardware and software applications. What is further desired are systems and methods that locate a lost device with high accuracy and robustness to active attacks. What is further desired are systems and methods that locate a lost device when geolocation alone insufficient, for example, when the device is located somewhere in a tall building.

Embodiments disclosed herein solve the aforementioned problems and other problems. An analytic server may monitor and collect wireless signals from a plurality of electronic devices, build a signal graph, and generate hyperclusters (signal clusters, also referred to as proximal groupings of wireless devices) based on the wireless signals. When the analytic server receives a request of finding a lost/missing device, the analytic server may receive observations from observation devices that sense/observe the wireless signals from the missing device. The analytic server may determine signal context, such as the hypercluster, and geolocation of the missing device based on the observations from observer devices. The analytic server may further perform resolution to narrow down the geolocation. The analytic server may also combat the active attack by exploring historical pattern and determine the probability of the lost device being in the current location based on the historical pattern. The analytic server may generate a graphical user interface comprising the location information of the missing device.

In one embodiment, a computer-implemented method comprises receiving, by a server, a request to locate a device comprising an identifier of the device; querying, by the server, a plurality of observer electronic devices to determine at least one observer electronic device that has detected a wireless signal emitted from the device; determining, by the server, that the at least one observer electronic device is proximate to at least one proximal grouping of electronic devices of a plurality of proximal groupings of electronic devices, wherein the plurality of proximal groupings of electronic devices are based on the spatial proximity and temporal persistence of respective signals emitted by the electronic devices; determining, by the server, a location of the device based on at least one of a location or a semantic resolution of the at least one proximal grouping of electronic devices; and generating, by the server, a graphical user interface configured to display the location of the device.

In another embodiment, a system comprises a non-transitory storage medium storing data records associated with a plurality of observer electronic devices; a server in communication with the plurality of observer electronic devices and configured to: receive a request to locate a device comprising an identifier of the device; query the plurality of observer electronic devices utilizing the data records stored in the non-transitory storage medium to determine at least one observer electronic device that has detected a wireless signal emitted from the device; determine that the at least one observer electronic device is proximate to at least one proximal grouping of electronic devices of a plurality of proximal groupings of electronic devices, wherein the plurality of proximal groupings of electronic devices are based on the spatial proximity and temporal persistence of respective signals emitted by the electronic devices; determine a location of the device based on at least one of a location or a semantic resolution of the at least one proximal grouping of electronic devices; and generate a graphical user interface configured to display the location of the device.

It is to be understood that both the foregoing general description and the following detailed description are exemplary and explanatory and are intended to provide further explanation of the invention as claimed.

BRIEF DESCRIPTION OF THE DRAWINGS

The accompanying drawings constitute a part of this specification and illustrate embodiments of the subject matter disclosed herein.

DETAILED DESCRIPTION

Figure 1A:
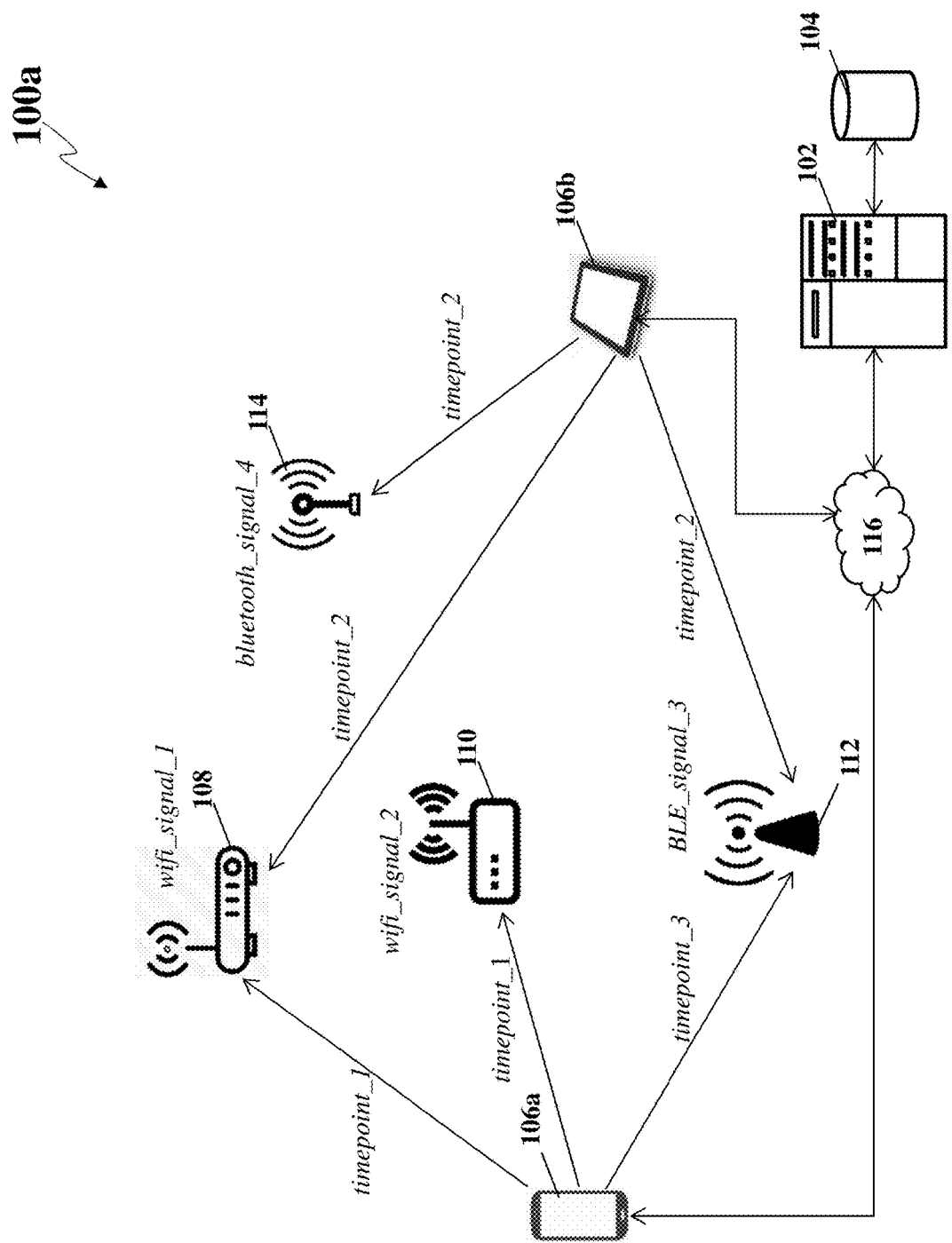
FIGS. 1A-1C illustrate network environments for tracking and locating electronic devices, according to an embodiment.

Reference will now be made to the illustrative embodiments illustrated in the drawings, and specific language will be used here to describe the same. It will nevertheless be understood that no limitation of the scope of the claims or this disclosure is thereby intended. Alterations and further modifications of the inventive features illustrated herein, and additional applications of the principles of the subject matter illustrated herein, which would occur to one ordinarily skilled in the relevant art and having possession of this disclosure, are to be considered within the scope of the subject matter disclosed herein. The present disclosure is here described in detail with reference to embodiments illustrated in the drawings, which form a part here. Other embodiments may be used and/or other changes may be made without departing from the spirit or scope of the present disclosure. The illustrative embodiments described in the detailed description are not meant to be limiting of the subject matter presented here.

Embodiments disclosed herein describe an analytic server that may monitor wireless signals detected by a plurality of electronic devices, build signal graphs and generate hyperclusters (signal clusters) by analyzing the wireless signals. The analytic server may track each electronic device by tracking the interactions of the electronic device with one or more signal environments, such as hyperclusters. When the analytic server receives a request indicating an electronic device is lost, the analytic server may locate the device based on the observations of the missing device from a plurality of observer devices. More specifically, the analytic server may receive the observations from the observer devices that observe wireless signals from the missing device. The analytic server may determine the signal context (such as an associated hypercluster) and the geolocation of the missing device based on the observations from the observer devices. In addition, the analytic server may perform a resolution of the wireless signals within the hypercluster to assign semantic meanings to the wireless signals. The semantic meaning may provide useful information on the location or environment the missing device is located in, such as location, business, and any other knowledge, which may help to narrow down the location of the missing device and provide location that is more precise.

The analytic server may also may combat active attacks which may spoof the missing device's geolocation (or latitude and longitude) and/or signal environment. In a first form an active attack, an attacker may spoof the device's geolocation. To combat this form of attack, the analytic server may match the device's geolocation (e.g., reported by a malicious observer device used for the attack) with the signal environment (e.g., one or more hyperclusters) associated with the device. If the geolocation matches with the signal environment, the analytic server may indicate that the geolocation has not been spoofed. If the geolocation does not match with the signal environment, the analytic server may indicate that the geolocation may be spoofed. A second form of attack may spoof the device's geolocation and its signal environment. To combat this form of attack, the analytic server may analyze signal environments of other observer devices. If there is a match between the signal environments, the analytic server may indicate that the signal environment has not been spoofed. Alternatively, the analytic server may determine whether other observer devices at the geolocation of the missing device have received wireless signals transmitted by the missing device. If the analytic server determines that other observer devices at the geolocation of missing device have not received the wireless signal transmitted by the missing device, the analytic server may indicate that the signal environment associated with the missing device is spoofed. A third form of attack may be advanced spoofing, the analytic server may analyze a historical pattern of the missing device and determine the probability of the missing device being in the current location based on the historical pattern. For example, if a purported location of the missing device is wildly out of its historical pattern, the analytic server may indicate that the location may have been spoofed. The analytic server may also generate a graphical user interface comprising the location information of the missing device.

FIG. 1A shows components of a network environment 100 for tracking and locating electronic devices. The system 100 may include an analytic server 102 and a database 104 coupled to the analytic server 102, wherein the analytic server 102 may receive information on wireless signals (or simply signals) detected by one or more observer devices 106 through a network 116 to generate one or more hyperclusters (also referred to as "proximal groupings of electronic devices"). The analytic server 102 may receive identification information about wireless signals detected by the observer devices 106a, 106b and store the identification information in the database 104 for further processing.

The analytic server 102 may explain the relationships in the physical world by measuring relationships between signals and devices. By approximating the world via temporal relationships between signals, the analytic server 102 may build a dataset to compute temporal persistence between devices. This dataset may be referred to as a signal graph (also referred to as "SignalGraph"). The signal graph is temporal graph model that may connect signals and observers into a network. The signal graph may comprise signals and observers (e.g., observer devices that observe the signals) at different time points.

The signal graph may provide information about relationships in the physical world. For example, the analytic server 102 may generate a set of hyperclusters (or signal clusters or proximal grouping of electronic devices) based on the spatial proximity and temporal persistence of the wireless signals. A hypercluster may be a set of signals that have been observed together within a number of observations. A given hypercluster may represent a set of devices that remain in physical proximity over time. In other words, a hypercluster is a static relationship between signals, as the proximity persists across time and observations.

The analytic server 102 may function as an interface for an administrator to set configuration settings or provide operational instructions to various components of the network environment 100. The analytic server 102 may be any device comprising a communications component capable of wired or wireless communication with other components of the network environment 100, and a microprocessor configured to transmit and receive certain types of data from the components of the network environment 100. Non-limiting examples of the analytic server 102 may include a desktop computer, a server computer, a laptop computer, a tablet computer, and the like. For ease of explanation, FIG. 1A shows a single computer device functioning as the analytic server 102. However, it should be appreciated that some embodiments may comprise any number of computing devices functioning as the analytic server 102 and capable of performing the various tasks described herein.

The analytic server 102 may be directly or indirectly connected to observer devices 106a, 106b and database 104. Accordingly, the analytic server 102 may be capable of wired or wireless communication through a variety of communication channels with the observer devices 106a, 106b and the database 104 over a network 116. During the wired or wireless communication between the analytic server 102, the observer devices 106a, 106b, and the database 104, each of these devices may be capable to transmitting and receiving data from each other. In some embodiments, each of these devices may normalize and format the data in accordance to pre-stored instructions prior to transmitting the data to other devices. In some embodiments, each of these devices may store a local copy of the data in their memory prior to transmitting original copy of the data to other devices.

Examples of a network 116 may include, but are not limited to, private or public LAN, WLAN, MAN, WAN, and Internet. The network 116 may include both wired and wireless communications channels according to one or more standards and/or via one or more transport mediums. The communication over the network 116 between the components of the network environment 100 may be performed in accordance with various communication protocols such as Transmission Control Protocol and Internet Protocol (TCP/IP), User Datagram Protocol (UDP), and IEEE communication protocols. In one example, the network may include wireless communications according to Bluetooth specification sets, or another standard or proprietary wireless communication protocol. In another example, the network may also include communications over a cellular network, including, e.g., a GSM (Global System for Mobile Communications), CDMA (Code Division Multiple Access), and EDGE (Enhanced Data for Global Evolution) network.

Observer devices 106a, 106b may be any computing and/or telecommunications devices comprising a processor and capable of performing various tasks and processes described herein. Non-limiting examples of the observer devices may include a telephone 106a (e.g., smartphone), a user computer 106b (e.g., desktop, laptop, server, tablet), or any other telecommunications or computing device capable of performing the various tasks and processes described herein. For ease of explanation, FIG. 1A shows two devices functioning as the observer devices 106a, 106b. However, it should be appreciated that some embodiments may comprise any number of observer devices capable of performing the various tasks described herein.

In some embodiments, observer devices 106a, 106b may be computing devices that function as sensor devices, and are directly or indirectly associated with an analytic server 102 and/or a database 104. The sensor devices may be capable of observing signals in their zone of operation emitted by various devices such as IoT devices. The sensor device may further include a sensor processor configured to process the observed signals and extract identification information from the observed signals. Non-limiting examples of the sensor technologies for the sensor devices may include resonant LC sensors, capacitive sensors, and inductive sensors. Based upon the particular type of the sensor waves used and the particular protocols associated with the sensor waves, the sensor devices may observe signals and then generate sensor data, which may include information associated with the observed signals. The sensor processor may receive, interpret, and process sensor data, which the sensor may then provide to a processor of the analytic server 102 and/or the database 104.

Each observer device may include identification information. The identification information may include a name of the observer device, a type of the observer device, a model number of the observer device, a location information of the observer device, and an ID of the observer device where the ID may be pseudo-random identifier such as a hash value. In some cases, each observer device may have multiple IDs and the IDs may change at any time. All past and current identification information of each of the observer device may be stored in a database 104. For example, a given observer device may have an old ID and a new ID, and in such as case, both the old and new IDs may be stored in the database 104. The analytic server 102 may have access to the identification information of each observer device stored in a database 104. The analytic server 102 may generate a query and/or a request and transmit the query and/or the request at any time to the database 104 to receive identification information of any observer device. In some cases, the analytic server 102 on receiving signal data from the observer device may query the database 104 to receive additional identification information regarding the observer device from which it received the signal data.

The analytic server 102 may set configuration settings or provide operational instructions to observer devices 106a, 106b to make observations of signals transmitted by various devices such as Internet of Things (IoT) devices and then provide analytics and data about signal observation application activity back to the analytic server 102. In some embodiments, the analytic server 102 may generate and transmit the operational instructions to the observer devices 106a, 106b at any point of time in order to enable the observer devices 106a, 106b to make the observations of the signals transmitted by various devices such as IoT devices, and then provide analytics and data about signal observation application activity back to the analytic server 102. In some embodiments, the analytic server 102 may generate and transmit the operational instructions to the observer devices 106a, 106b at any point of time in order to disable the observer devices 106 from making any observations of the signals transmitted by various devices such as IoT devices, and then notify the successful disablement of the observer devices 106a, 106b back to the analytic server 102. In some embodiments, the analytic server 102 may also transmit a weblink of configuration settings to the observer devices 106a, 106b, and the observer devices 106a, 106b may use the weblink for installation of the configuration settings in their hardware and/or software. The configuration settings may enable or disable the observer devices 106a, 106b to make the observations of the signals transmitted by various devices such as IoT devices, and then provide analytics and data about signal observation application activity back to the analytic server 102. In some cases, the configuration settings may enable the observer devices 106a, 106b to make the observations of the signals transmitted by various devices such as IoT devices for a limited period of time (such as 2 hours a day) in the day, and the same configuration settings may also disable the observer devices 106a, 106b from making any observations of the signals during the rest of the day. In some cases, the configuration settings may disable the observer devices 106a, 106b from making any observations of the signals when their battery charge is below a predetermined threshold. For this purpose, the configuration settings may allow the analytic server 102 to constantly monitor battery charge of the observer devices 106a, 106b and when the battery charge is below a predetermined threshold, and then the analytic server 102 may disable the observer devices 106a, 106b from making any observations of the signals. In some cases, the configuration settings may disable some applications of the observer devices 106a, 106b when their battery charge is below a predetermined threshold to allow the observer devices 106a, 106b from making observations of the signals.

The analytic server 102 may receive data including wireless signals detected by observer devices 106a, 106b. In some embodiments, the observer devices 106a, 106b may transmit the data including observed signals to the analytic server 102 as soon as the analytic server 102 detects any signals. In some embodiments, the observer devices 106a, 106b may transmit the observed signals to the analytic server 102 after a predetermined period of time. For example, the observer devices 106a, 106b may be programmed to periodically (e.g., daily) transmit data including all observed signals to the analytic server 102. In some embodiments, the analytic server 102 may fetch data including the observed signals data from the observer devices 106a, 106b periodically (e.g., daily). In some embodiments, the analytic server 102 may fetch data including the observed signals data from the observer devices 106a, 106b based on a triggering condition (e.g., time-based periodic updates, real-time updates). The data may include, but may not be limited to, all observed wireless signals, a time point at which each wireless signals was observed, approximate latitude coordinates of where event of observation is recorded, approximate longitude coordinates of where event of observation is recorded, among other data and identification information.

The analytic server 102 may store all the data such as observed wireless signals, a time point at which each wireless signals was observed, approximate latitude coordinates of where event of observation is recorded, and approximate longitude coordinates of where event of observation is recorded in a database 104 for further processing. In some embodiments, the analytic server 102 may store all the data in the database 104 in a format in which all the data was received by the analytic server 102. In some embodiments, the analytic server 102 may first normalize and format all the data, and then store the normalized and formatted version of the data in the database 104. The analytic server 102 may use any suitable normalization and formatting technique to normalize and format all the data depending on content, received format, structure, and size of the data. Upon normalization and formatting of the data, the analytic server 102 may execute algorithms such as clustering algorithms to generate one or more hyperclusters of the signal datasets. Each hypercluster may represent a set of signals that have been observed together by the observer devices 106a, 106b within a number of observations made by the observer devices 106a, 106b. In some cases, for every two observations in the hypercluster, there may exist at least two overlapping observations that contain said two observations.

As illustrated in FIG. 1A, a first observer device 106a may detect, at timepoint_1, wifi_signal_1 generated by a first Wi-Fi router 108 and wifi_signal_2 generated by a second Wi-Fi router 110. A second observer device 106b may detect, at timepoint_2, wifi_signal_1 generated by the first Wi-Fi router 108, bluetooth_signal_4 generated by Bluetooth transmitter 114, BLE_signal_3 generated by a Bluetooth low energy (BLE) transmitter 112. Furthermore, the first observer device 106a may detect, at timepoint_$^+$3, the BLE_signal_3 generated by the BLE transmitter 112. Each of the aforementioned signals may include a tuple of (name, MAC_address, type). Two signals may be equivalent of all three elements are equivalent.

Each observer device 106a, 106b may transmit through the network 116 information of the detected signals to the analytic server 102 for storage in the database 104 and for further analysis. Based on the temporal persistence and spatial proximity of the signals observed by the observer devices 106a, 106b and received by the analytic server 102, the analytic server 102 may define one or more hyperclusters (or proximal groupings of electronic devices) associated with the location where the signals are received from.

The data model employed by the analytic server 102 to identify the hyperclusters may include a set of signals S observed by a population of observer mobile devices U. In the illustrative network environment 100a, S={wifi_signal_1, wifi_signal_2, BLE_signal_3, bluetooth_signal_4} and U={106a, 106b}. As described above, each of the signals in the set of signals S may include a tuple of (name, MAC_address, type). The analytic server 102 may identify each observer device 106 with a respective mobile advertising identifier (or any other identifier assigned to or associated with the app or observer device 106), abbreviated as adid. The analytic server 102 may associate each adid of the observer devices 106a, 106b with a matrix of signals and time points. More specifically, the analytic server 102 may construct a sparse Boolean matrix to denote which signals an observer adid observed in a given time window. In other words, the Boolean matrix for the observer device 106a, 106b may indicate a presence of (indicated by entry 1) or absence of (indicated by entry 0) one or more signals, as detected by the observer device 106a, 106b for a particular time period. The analytic server 102 may, however, discard signals at stale time points as reported by the observer devices 106a, 106b even though the stale time points may not indicate a nefarious behavior. For example, if an observer device 106a, 106b has a single observation that stretches credulity (threshold set at more than five days lag), the analytic server 102 may simply remove the observation. In some embodiments, the observer devices 106a, 106b may also transmit the respective latitude longitude coordinates of the observer devices 106a, 106b.

Figure 1B:
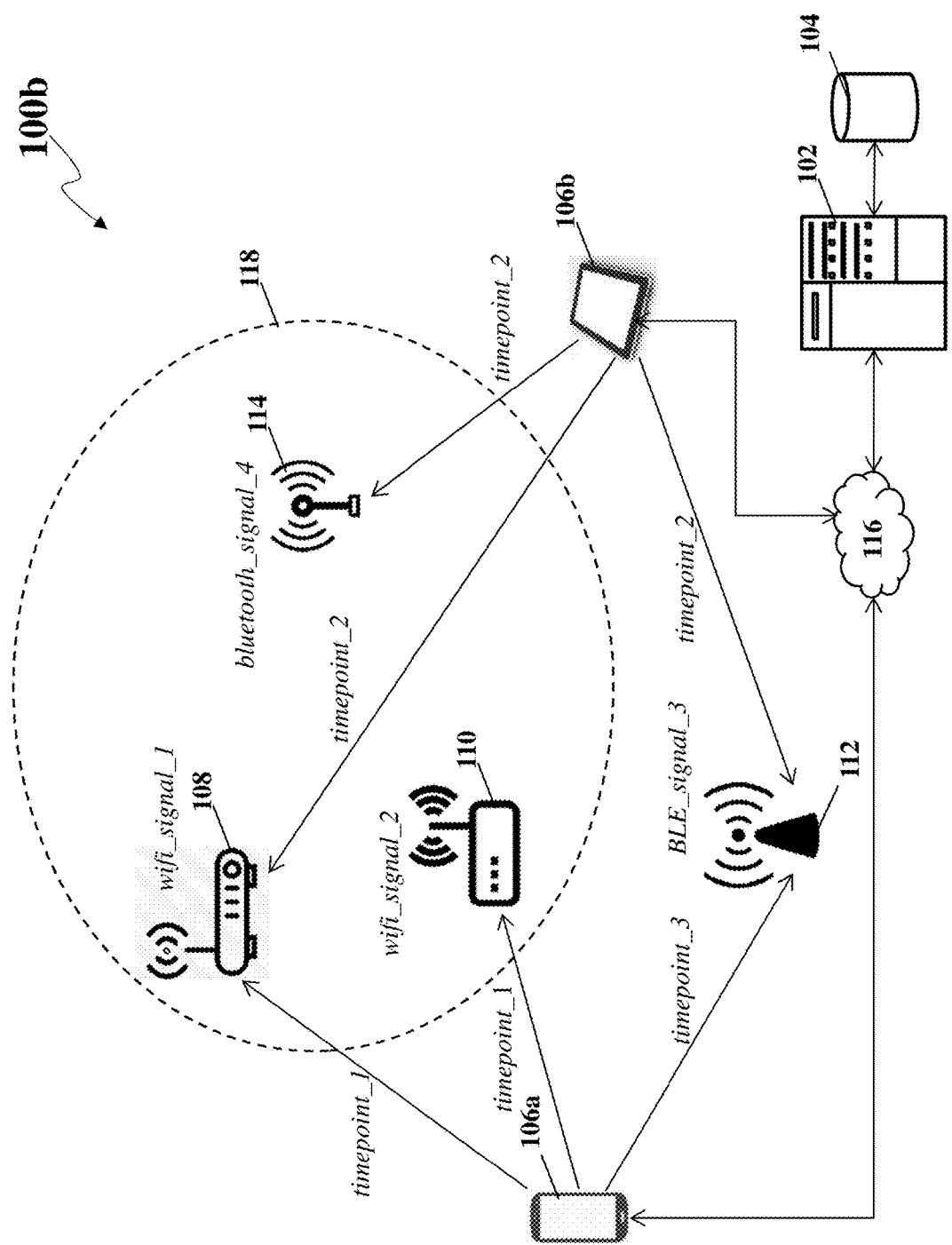

Based on the analysis of the matrices associated with the observer devices 106, the analytic server 102 may generate one or more hyperclusters based on the temporal persistence and spatial proximity of the received signals. FIG. 1B shows a network environment 100b including hypercluster 118 generated by the analytic server 102 based on the wireless signals detected by the observer devices 106. In this illustration, the hypercluster 118 may contain three wireless signals: wifi_signal_1, wifi_signal_2, bluetooth_signal_4. The analytic server 102 may determine the spatial proximity of wifi_signal_1, wifi_signal_2, bluetooth_signal_4 based on the fact that the these signals were detected simultaneously or near-simultaneously by the observer devices 106a, 106b. The analytic server 102 may determine the temporal persistence of wifi_signal_1, wifi_signal_2, bluetooth_signal_4 based on the fact that the two observer devices 106a, 106b observed these signals at two time points: the first observer device 106a observed these signals at timepoint_1 and the second observer device 106b observed these signals at timepoint_2. However, the analytic server 102 may determine that BLE_signal_3, even though having spatial proximity with wifi_signal_1, wifi_signal_2, bluetooth_signal_4 may not have the requisite temporal persistence. For example, the first observer 106a did not detect BLE_signal_3 at timepoint_1.

The observer devices 106a, 106b may be directly or indirectly connected to the analytic server 102 and a database 104. Accordingly, the observer devices 106a, 106b may be capable of wired or wireless communication through a variety of communication channels with the analytic server 102 and the database 104 over a network 116. During the wired or wireless communication between the observer devices 106a, 106b, the analytic server 102, and the database 104, each of these devices may be capable to transmitting and receiving data from each other. In some embodiments, the observer devices 106 may normalize and format the data in accordance to pre-stored instructions prior to transmitting the data to the analytic server 102 and/or the database 104. In some embodiments, the observer devices 106a, 106b may store a local copy of the data in their memory prior to transmitting original copy of the data to the analytic server 102 and/or the database 104.

The observer device 106a, 106b may be configured to observe an event. The event may contain all signals that the observer device 106a, 106b scanned around its zone of operation at a given time point. Accordingly, the event may include observed signal data, and in some cases, the event may also include approximate or correct values of latitude coordinates of where the event is recorded by the observer device 106a, 106b at a given time point. In some cases, the event may further include approximate or correct values of longitude coordinates of where the event is recorded by the observer device 106a, 106b at a given time point.

The event is caused when observer device 106a, 106b observes signals from various devices such as IoT devices. The signals may be an electromagnetic signal emitted by the IoT devices. It is to be noted that the signal may be any type of signal emitted by the IoT devices without moving out the scope of the disclosed embodiments. The signals observed by the observer device 106a, 106b may represent discrete values about the signals. In some embodiments, the discrete values of the signals may be characterized by a type of signal. The type of signal may include, but may not be limited to, a Bluetooth® signal, wireless fidelity (Wi-Fi) signal, or Bluetooth Low Energy (BLE) signals. In some embodiments, the discrete values of the signals may further be characterized by a name of signal. The name of the signal may be a SSID (service set identifier) that identifies an IoT device. The SSID may be a unique ID that consists of 32 characters and is used for naming wireless networks. In some embodiments, the discrete values of the signals may further be characterized by an address of the IoT device through which the device communicates the signal. Each IoT device may emit multiple signals.

Network components may effectuate wired and/or wireless signal communications to and from various devices. The network components may include transmitters, a first Wi-Fi router 108, a second Wi-Fi router 110, and a Bluetooth low energy (BLE) transmitter 112. These network components may be an embedded component of an electronic device; and, in some cases, the network component may be attached to the electronic device through any wired or wireless communications medium. The network components such as the first Wi-Fi router 108, the second Wi-Fi router 110, and the Bluetooth low energy (BLE) transmitter 112 may include electromechanical components (e.g., processor, antenna) that allow the network components to communicate various types of signal data with one or more electronic devices. In some implementations, these signals may represent a distinct channel for hosting communications. The data may be communicated using signals, based on predetermined wired or wireless protocols and associated hardware and software technology. The network components may operate based on any number of communication protocols, such as Bluetooth®, Wireless Fidelity (Wi-Fi), and others.

Databases 104 may be directly or indirectly connected to observer devices 106a, 106b and an analytic server 102. Accordingly, the database 104 may be capable of wired or wireless communication through a variety of communication channels with the observer devices 106a, 106b and the analytic server 102 over a network 116. During the wired or wireless communication between the analytic server 102, the observer devices 106a, 106b, and the database 104, the database 104 is capable of receiving data from the analytic server 102 and the observer devices 106. The data may include, but may not be limited to, all observed wireless signals, a time point at which each wireless signals was observed by the observer devices 106a, 106b, approximate latitude coordinates of where event of observation is recorded by the observer devices 106a, 106b, approximate longitude coordinates of where event of observation is recorded by the observer devices 106a, 106b, among other data and identification information. For ease of explanation, FIG. 1A shows a single database 104. However, it should be appreciated that some embodiments may comprise any number of databases capable of performing the various tasks described herein.

The database 104 may have a logical construct of data files that are stored in non-transitory machine-readable storage media, such as a hard disk or memory, controlled by software modules of a database program (for example, SQL), and a related database management system (DBMS) that executes the code modules (for example, SQL scripts) for various data queries and other management functions generated by the analytic server 102 and the observer devices 106a, 106b. In some embodiments, a memory of the databases 104 may be a non-volatile storage device. The memory may be implemented with a magnetic disk drive, an optical disk drive, a solid-state device, or an attachment to a network storage. The memory may include one or more memory devices to facilitate storage and manipulation of program code, set of instructions, tasks, data, PDKs, and the like. Non-limiting examples of memory implementations may include, but are not limited to, a random access memory (RAM), a read only memory (ROM), a hard disk drive (HDD), a secure digital (SD) card, a magneto-resistive read/write memory, an optical read/write memory, a cache memory, or a magnetic read/write memory. In some embodiments, a memory of the databases 104 may be a temporary memory, meaning that a primary purpose of the memory is not long-term storage. Examples of the volatile memories may include dynamic random access memories (DRAM), static random access memories (SRAM), and other forms of volatile memories known in the art. In some embodiments, the memory may be configured to store larger amounts of information than volatile memory. The memory may further be configured for long-term storage of information. In some examples, the memory may include non-volatile storage elements. Examples of such non-volatile storage elements include magnetic hard discs, optical discs, floppy discs, flash memories, or forms of electrically programmable memories (EPROM) or electrically erasable and programmable (EEPROM) memories.

Figure 1C:
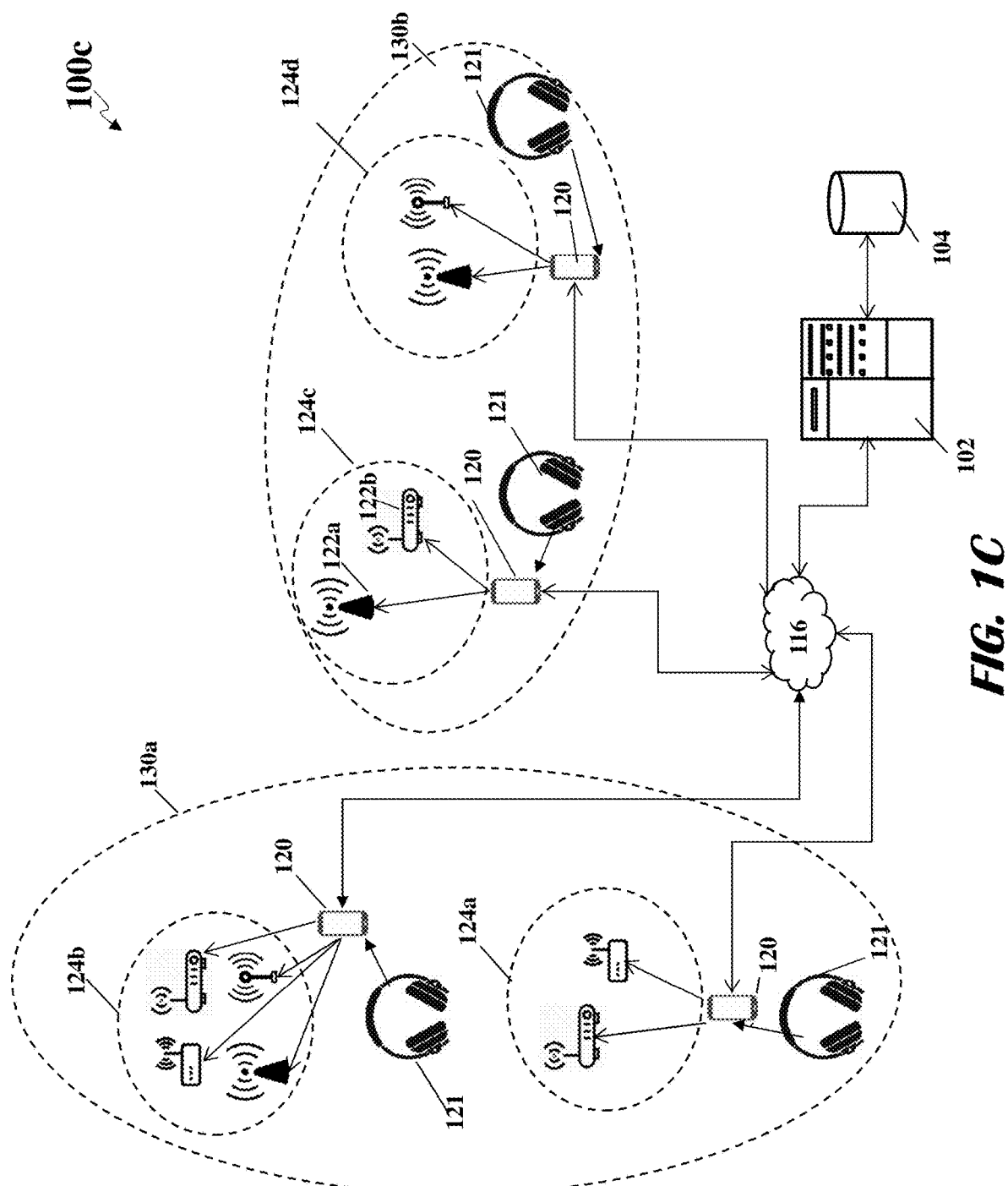

FIG. 1C illustrates a network environment 100c for tracking and locating electronic devices, according to an embodiment. The analytic server 102 may receive an indication from another server (not shown) that a mobile app has been installed on the observer electronic device 120. In response, the analytic server 102 may communicate with the observer electronic device 120 or one or more apps installed therein to track the interactions of the observer electronic device 120 with one or more signal environments. The observer electronic device 120 may interact with the signal environment by detecting wireless signals around the environment. For example, the observer electronic devices 120 may detect wireless signal from a target device 121 and other wireless signals from signal clusters (proximal groupings of electronic devices) 124a, 124b, 124c, 124d. The target device 121 may be a missing/lost device or a device to be tracked periodically. The analytic server 102 may store the interactions information into the database 104. Based on these interactions, the analytic server 102 may determine the location of the observer electronic device 120. Assuming the observer electronic device 120 is in proximity to the target device 121, the analytic server may determine the location of the target device 121. In particular, the analytic server 102 may keep track and determine the hyperclusters (signal clusters or proximal groupings of electronic devices) the observer electronic device 120 detected. As the target device 121 moves, the observer electronic device 120 that detects the wireless signals emitted from the target device 121 may detect different hyperclusters within the same geolocation or from different geolocations. For example, signal clusters 124a, 124b may be co-located at the same or nearly same geolocation 130a. Furthermore, signal clusters 124c, 124d may be co-located at the same or nearly same geolocation 130b. As shown herein, the analytic server 102 may observe four changes in signal context: hyperclusters 124a, 124b, 124c, 124d. However, these four hyperclusters may be associated with two geolocations 130a, 130b. In other words, the same geolocation may include multiple hyperclusters with each hypercluster corresponding to a microlocation within the same geolocation. Thus, the hyperclusters may be able to provide more accurate and fine-grained location information. For example, hyperclusters may be sufficient to identify a specific location in a tall building while geolocation of a tall building may not be sufficient.

When the analytic server 102 receives a request indicating that the target device 121 is lost, the analytic server 102 may locate the observer device 120 that detects wireless signals emitted from the target device 121 based on the signal environment the observer electronic device 120 is in. The analytic server 102 may receive the request to find the missing target device 121, and receive observation from the observer electronic device 120 or a plurality of other electronic devices (not shown) that observe/sense wireless signals emitted from the target device 121. Based on the observations comprising the wireless signal from the target device 121 and other wireless signals within the environment such as wireless signals from a BLE transmitter 122a and a Wi-Fi router 122b, the analytic server may determine that the observer electronic device 120 and the target device 121 are in geolocation 130b and in the signal context of hypercluster 124c.

Furthermore, the analytic server 102 may perform a resolution of the wireless signals from the BLE transmitter 122a and/or the Wi-Fi router 122b within hypercluster 124c to assign semantic meanings or atoms to the wireless signals. The semantic meanings or atoms may be knowledge on a given signal in terms of business, manufacture, function, location, and the like. Such wireless signals may provide more information on the location or environment the target device 121 is located in. For example, the analytic server 102 may resolve the wireless signals from the BLE transmitter 122a and the Wi-Fi router 122b within hypercluster 124c. The resolution results of the wireless signals may include the location, business, and any other knowledge associated with the wireless signals. For example, the resolution results may indicate that these signals are from a coffee store (e.g., Starbucks). Such information may further narrow down the mobile device's location. For example, based on the geolocation, the analytic server may be able to determine a specific building; based on the semantic meanings (e.g., business), the analytic server may be able to determine a specific store in the building.

In addition, the analytic server 102 may combat active attacks that may spoof the geolocation (or latitude and longitude) and/or the signal environment of the target device 121. In a first form of attack, an attacker may spoof the geolocation of the target device 121. More specifically, an observer device 120, upon detecting a wireless signal from the target device 121 may transmit a spoofed geolocation to the analytic server 102. For example, the observer device 120 may detect the wireless signal from the target device 121 at location 130a but may transmit an indication to the analytic server that the target device 121 was detected at location 130b. To combat this form of attack, the analytic server 102 may compare the reported geolocation of the target device 121 with the target device 121's signal environment. If there is match between the reported geolocation and the signal environment (e.g., the observer device 120 reporting being in proximity to hypercluster 124a while reporting location 130a), the analytic server may determine that that the geolocation has not been spoofed. If however, there is no match between the reported geolocation of the target device 121 with the target device 121's signal environment (e.g., the observer device 120 reporting being in proximity to hypercluster 124 while reporting location 130b), the analytic server 102 may determine the observer device 120 may be an attacker transmitting a spoofed geolocation. Although the aforementioned description details the observer device 120 reporting geolocation and signal environment to the analytic server, it should be understood that the target device 121 may report its geolocation and signal environment and the analytic server 102 may perform the comparison to determine whether the reported geolocation has been spoofed. The analytic server 102 may also generate an indication that the geolocation is likely spoofed.

In a second form of attack, an attacker may spoof the geolocation and the signal environment of the target device 121. For example, an observer device 120 (or the target device 121) may maliciously report a potentially spoofed geolocation and a potentially spoofed signal context of the target device 121 to the analytic server 102. To combat this form of attack, the analytic server 102 may receive and analyze the signal environments of other observer devices 120 that may be within the same signal context of the observer device 120 (or the target device 121). If there is a match between the signal environments, e.g., the observer device 120 and the other observer devices 120 report the same signal environment, the analytic server may 102 determine that the observer device 120 is not an attacker device. However, if there is no match between the signal environment reported by the observer device 120 (or the target device 121) and other observer devices 120, the analytic server 102 may determine that the observer device 120 is an attacker device. In some embodiments, the analytic server 102 may determine whether the other observer devices 120 have received wireless signals transmitted by the target device 121. If the other observer devices 120 report that they have received the wireless signals transmitted by the target device 121, the analytic server 102 may determine that the observer device 120 is not an attacker device. However, if the other observer devices 120 report that they have not received the wireless signals transmitted by the target device 121, the analytic server may determine that the observer device 120 may be an attacker device and its signal environment is likely spoofed. The analytic server 102 may also generate an indication that the signal environment is likely spoofed.

A third form of attack may be advanced spoofing, wherein an attacker may spoof multiple geolocations and signal environments associated with a target device 121. To combat this form of attack, the analytic server may analyze historical pattern of the target device 121 and determine the probability of the target device 121 being in the current location based on the historical pattern. For example, the analytic server 102 may retrieve the historical pattern associated with the target device 121, which may include last seen location 103a from the database 104. To determine if the geolocation 130b is faked, the analytic server 102 may determine a probability of the target device 121 moving from the last seen location 130a to the current location 130b within a time difference. If the probability satisfies a threshold, the analytic server 102 may determine the geolocation 130b is not faked; otherwise, the analytic server may determine that the geolocation 130b is faked. The analytic server 102 may analyze other patterns of the movement of the target device 121. For example, a target device 121 associated with a frequent international traveler may interact with multiple signal environments such as a plurality of hyperclusters associated with airports and hotels. However, a target device 121 associated with an office worker may interact with a hypercluster associated with his home and his office. If the analytic server 102 determines that that there is an aberration in the historical pattern of behavior, the analytic server 102 may generate an indication that there is an advanced spoofing.

Figure 2:
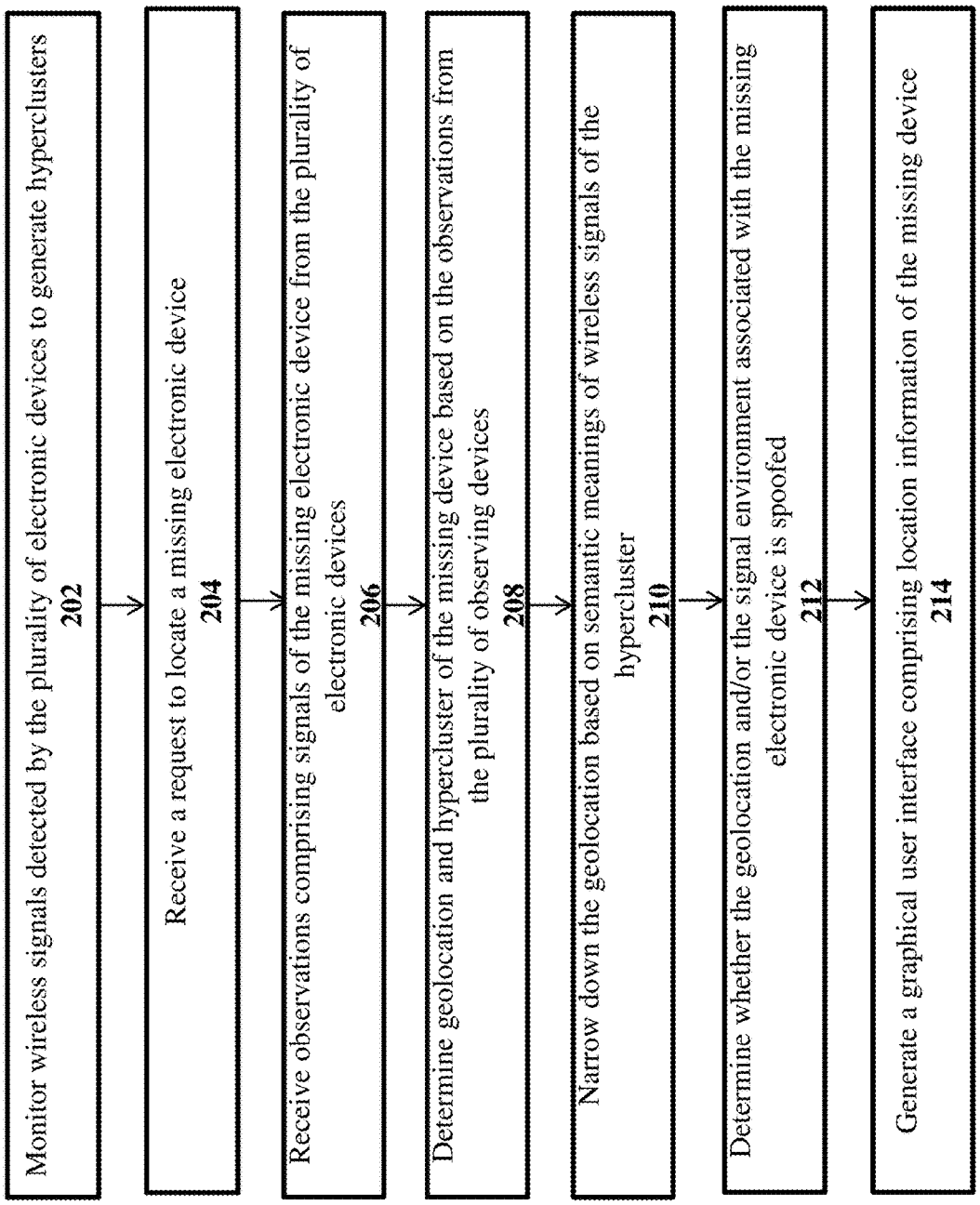
FIG. 2 illustrates a flowchart for tracking and locating electronic devices, according to an embodiment.

FIG. 2 shows a flow diagram 200 of a method for tracking and locating electronic devices, according to an illustrative embodiment. Other embodiments may comprise additional or alternative steps, or may omit some steps altogether. Although multiple computing systems and databases can implement one or more steps of the method, this description details, for brevity, an analytic server implementing the various steps of the method.

At step 202, the analytic server may monitor wireless signals detected by a plurality of electronic devices to generate hyperclusters (also referred to as proximal groupings of wireless devices). In operation, the analytic server may trigger a signal scanning function on the electronic devices. An electronic device may be a mobile device (or handheld computer) that is portable enough to hold and operate in the hand. Typically, any handheld computer device will have a liquid-crystal display (LCD) flat screen interface, providing a touchscreen interface with digital buttons and keyboard or physical buttons along with a physical keyboard. Many such devices can connect to the Internet and interconnect with other devices such as car entertainment systems or headsets via Wi-Fi, Bluetooth, cellular networks or near field communication (NFC). Mobile devices may run mobile operating systems that allow third-party apps specialized for said capabilities to be installed and run. In the embodiments disclosed herein, the users of the electronic devices may install a software application from a vendor and the analytic server may receive the notifications from one or more servers of the vendor. The installation of the software application may trigger a signal scanning function on the electronic devices. The signal scanning function may enable the electronic devices to detect different wireless signals around the electronic device. The wireless signals may comprise Wi-Fi, Bluetooth, and Bluetooth Light (BLE). The installation of the software application may also trigger the electronic devices to transmit the detected wireless signals to the analytic server. For instance, the electronic devices may transfer a tuple of (name, MAC_address, type) for the detected signals.

The analytic server may monitor wireless signals detected by the plurality of electronic devices. The analytic server may collect the wireless signals detected/observed by the electronic devices at different time points. In some embodiments, the plurality of electronic devices may also report the geolocation data, such as latitude and longitude coordinates of where the observation is recorded. The analytic server may store the observations of the wireless signals and the geolocation data (if available) into a database.

The analytic server may collect the wireless signals detected/observed by the electronic devices at different time points periodically. For example, the analytic server may query the detected wireless signals from the electronic devices every minute. The analytic server may monitor the electronic devices for a predetermined time window (e.g., a sliding window). For example, the analytic server may monitor the electronic devices for seven days or three months.

The analytic server may monitor a given population of electronic mobile devices (users). Each electronic mobile device reports the detected signals to the analytic server. Let S denote a set of signals observed by the given population of mobile devices. As described above, a signal s may be a tuple (name, MAC_address, type). The analytic server may consider two signals to be equivalent if all three elements are equivalent. Each mobile user may be identified with a mobile advertising identifier, sometimes abbreviated as adid. Different adids may represent different mobile phones and users. Each adid may be associated with a matrix of signals and time points. Each row is a signal in S, while time points T are of minute precision, and may be closed by a given time window for the analysis. The analytic server may construct a sparse Boolean matrix, $U \rightarrow Bool^{S \times T}$ to store which signals the mobile adid u observed in the given time window. If a mobile device observed a signal s at time t, the analytic server may set the corresponding element in the matrix to 1; otherwise, set the element to 0.

In some embodiments, electronic devices report time points that may become stale over a few days. Whether or not this is indicative of nefarious behavior, doing time-dependent signal analysis on an observer's (e.g., the mobile phone's) signal observations may be difficult for the analytic server if their times are overly stale. If an observer had a signal observation that stretches credulity (the threshold set at more than five days lag), the analytic server may remove that observation (e.g., the detected wireless signals). In some embodiments, the analytic server may remove from consideration an observer (e.g., mobile device) with two or more incredible time points.

The analytic server may analyze the wireless signals to generate hyperclusters. More specifically, the analytic server may analyze the wireless signals collected at different time points from different electronic devices to build the signal graph and generate a set of hyperclusters (or signal clusters) based on the spatial proximity and temporal persistence of the wireless signals. The analytic server may save the signal graph, the hyperclusters, and corresponding geolocation data into the database.

As discussed above, the analytic server may build the signal graph that connects signals and observations into a network. The signal graph may comprise signals and observers (e.g., observer devices that observe the signals) at different time points. The analytic server may generate a set of hyperclusters (or signal clusters) based on the spatial proximity and temporal persistence of the wireless signals. A hypercluster may be a set of signals that have been observed together within a number of observations. A given hypercluster may represent a set of devices that remain in physical proximity over time. In other words, a hypercluster is a static relationship between signals, as the proximity persists across time and observations. The hyperclusters may provide useful information (e.g., location) on the physical world in terms of signals. The analytic server may utilize such information to determine the movement or location changes of a mobile device.

At step 204, the analytic server may receive a request to locate a missing electronic device. The request may comprise the identifier of the missing device. The identifier may be BLE standard unique identifier. Alternatively, the identifier may be MAC (media access control) address. In operation, a user may open a website in an Internet browser or a local application on an electronic client device configured to receive a request from the user. The analytic server may display a graphical user interface (GUI) for the user to input the request. For example, the user interface may include a text-based interface where the user can manually type requests and provide identifiers of missing devices using a keyboard. In another example, the user interface may include an audio-based interface where the user can issue requests by verbally requesting a service.

In some embodiments, instead of looking for a missing electronic device, the analytic server may actively monitor the electronic device and report the locations of the electronic device by triggering an electronic message. In operation, the analytic server may provide the option to turn on or turn off an alert-triggering mechanism in the GUI. When the user turns on the alert-triggering mechanism, the analytic server may either periodically report the locations of the electronic device or trigger alert electronic messages when the device is acting out of pattern, or has moved out of a safe zone. For example, the analytic server may determine the changes of the hyperclusters of the electronic device, and transmit an alert electronic message when the changes of the hyperclusters satisfy a threshold. The alert electronic message may be proactive messages including instant messages, SMS, emails, text message, phone calls, and the like. More specifically, the analytic server may monitor or keep tracking of the signal environment (e.g., hyperclusters) of the electronic device and determine the locations of the electronic device based on the observations from a plurality of observer devices that detect the wireless signals emitted by the electronic device. The analytic server may periodically report the locations of the electronic device. Alternatively, the analytic server may determine if the electronic device is acting out of pattern by determining how likely the device has changed dramatically, and only trigger an alert when the electronic device is acting out of pattern. However, the device may act out of pattern legitimately. For example, a luggage with BLE communication capability may be in home most of time, and start acting out of pattern when the user is travelling. The analytic server may need to be able to determine that such out of pattern actions are legitimate based on the user's reaction to the alert electronic message. For example, the analytic server may send an alert electronic message to the user: "this luggage is located in Starbucks coffee store in airport A, is it lost?" The user may indicate if the moving of the electronic device is legitimate or not by responding to the alert electronic message.

In some embodiments, the analytic server may allow a user to customize safe zones for an electronic device. In other words, the analytic server may allow the user to customize her ability to track the electronic device's movement vis-à-vis a fixed point. In some instances, the user, through an application installed in a mobile device or through a user interface provided by the analytic server, may designate an area (e.g., a room, floor, or a building) as a safe zone and instruct the analytic server to trigger alerts if the electronic device leaves the area. For example, the electronic device may be smart suitcase that the user may leave at a hotel reception after checkout. The user may instruct the analytic server to generate a trigger if the smart suitcase is moved out of the hotel reception/lobby area. In some instances, the user may, through the application or the user interface, instruct the analytic server generate an alert in an event the electronic device moves. In these instances, the last reported location of the electronic device may be the safe zone, until updated by the user.

At step 206, the analytic server may receive observations comprising the wireless signals emitted by missing electronic device from the plurality of electronic devices. The plurality of electronic devices may act as a network of sensors or observers for the missing device. In some embodiments, the analytic server may enable a reporting function of the software application on each of the plurality of electronic devices and request each electronic device to observer wireless signals from the missing device. Once the observer electronic devices detect the wireless signals emitted from the missing device based on the missing device identifier, the observer electronic devices may transmit the observed data to the analytic server. In some other embodiments, the analytic server may monitor wireless signals detected by the plurality of electronic devices by continuously receiving the wireless signals. Once the analytic server receives the request to locate a missing device, the analytic server may retrieve the wireless signals detected by different devices and determine which devices sense the wireless signals emitted by the missing device. Such devices are observer devices that detect the wireless signals from the missing device. The observer devices may also observe other wireless signals around the environment. The analytic server may further analyze the observations from such observer devices to determine the location information.

An observation may comprise detected Wi-Fi, Bluetooth, and/or BLE signal identifiers, including SSID (signal name), MAC address and/or universally unique identifier (UUID), tech (Wi-Fi, Bluetooth, BLE) and RSSI (relative measure of signal strength). Each observation may also include the following fields: token, a unique key provided by the analytic server to the app developer; ID, such as Google adid or iOS idfa (advertising identifier), the pseudorandom, resettable advertising identifier attributed to a smartphone by its operating system; the freshest available latitude/longitude reading from the smartphone; timestamp, data and time of the observation; metadata including SDK (software development kit) version, app name, device model and manufacture, and a tag assigned to the app by the developer. Assuming the observer electronic devices are within the same location of the missing device, the analytic server may leverage the observer electronic devices to determine the location of the missing device. The analytic server may query and refresh the observation input from the observer devices as frequently as possible.

At step 208, the analytic server may determine geolocation and hypercluster of the missing device based on the observations from the plurality of observer devices. The observation of each observer device may comprise the wireless signals of the missing device and other wireless signals from the surrounding environment. Because the observer devices are within the same location of (or in proximity to) the missing device, the analytic server may leverage the geolocation and hypercluster of the observer devices to locate the missing device. As discussed above, the analytic server may build hyperclusters based on the monitoring of the plurality of electronic devices. Based on the observations from the plurality of observer devices, the analytic server may determine the signal context, such as hypercluster, of the missing device by determining the hypercluster of the observer devices that detect wireless signals from the missing device. For example, the analytic server may query the list of detected wireless signals from the observer devices and determine the corresponding hypercluster. In some other embodiments, the analytic server may be able to receive the geolocation directly from the observer devices when GPS (global positioning system) data is available. The analytic server may determine the location of the missing device continuously (e.g., 15-minute frequency) until the missing device is located within the signal graph. Alternatively, the analytic server may refresh the location of the missing device if the missing device is in movement.

The hypercluster may provide information on the signal environment of the missing device, and further provide information on the physical environment, such as such as more precise geolocation, of the missing device. Because a hypercluster may be a set of signals that have been observed together within a number of observations, a given hypercluster may represent a set of devices that remain in physical proximity over time. In other words, a hypercluster may correspond to a physical location. The analytic server may determine the physical location based on the hypercluster. For example, the analytic server may retrieve a database storing the hyperclusters and the corresponding locations.

In some embodiments, the analytic server may monitor the plurality of electronic devices, build the signal graph, and analyze the wireless signals from the plurality of electronic devices in the signal graph to determine the hyperclusters in an on-demand mode, which may provide results that are more precise. In some other embodiments, the analytic server may determine the hyperclusters in a streaming mode, for example, the analytic server may build the hyperclusters per day.

At step 210, the analytic server may determine precise location within the geolocation or narrow down the geolocation based on semantic meanings of the wireless signals of the hypercluster. The analytic server may perform resolution of the wireless signals to assign semantic meanings or atoms to the wireless signals based on three classifiers: SSID (service set identifier) syntactic classifier, MAC syntactic classifier, and graph structure classifier. The semantic meanings or atoms may be knowledge on a given signal in terms of business, manufacture, function, location, and the like. Such wireless signals may provide more information on the location or environment the missing device is located in.

The SSID syntactic classifier may identify correct SSID-business pairing given a set of SSID (wireless signal names) and a set of business names. The MAC syntactic classifier may input an organizationally unique identifier (OUI) and return a probability vector for different manufactures. An organizationally unique identifier (OUI) is a 24-bit number that uniquely identifies a vendor, manufacturer, or other organization. They are used as the first portion of derivative identifiers to uniquely identify a particular piece of equipment as MAC addresses. Based on the OUI included in the MAC address of a device, the analytic server may determine the manufacture of the device. The graph structure classifier may determine location, business and any other atoms for the wireless signals based on the hyperclusters. Different hyperclusters may have different patterns. For example, a hypercluster from a hotel may be observed by many different devices, while a hypercluster from a home may be observed by a limited number of devices. The analytic server may utilize such patterns to determine semantic meanings or atoms.

For example, the analytic server may resolve the wireless signals of the hypercluster. The resolution results may indicate that these signals are from a coffee store (e.g., Starbucks). Such information may further narrow down the mobile device's location. Based on the geolocation, the analytic server may be able to determine a specific building; based on the semantic meanings (e.g., business), the analytic server may be able to determine a specific store in the building.

The analytic server may return the following data regarding the missing device: freshness, date and time of last observation; latitude/longitude, freshest reported latitude/longitude coordinates; cluster, identifier information about wireless signals observed in proximity to the targeted device, atoms, attributes for signals within the cluster to describe a venue or location (e.g., Starbucks).

At step 212, the analytic server may determine whether the geolocation and/or the signal environment is spoofed. The active attacks that involve spoofing the geolocation and/or the signal environment may come in three forms. In a first form an active attack, an attacker may spoof the missing electronic device's geolocation. To combat this form of attack, the analytic server may match the missing electronic device's geolocation (e.g., reported by a malicious observer device used for the attack or the missing electronic device itself) with the signal environment (e.g., one or more hyperclusters) associated with the missing electronic device. If the geolocation matches with the signal environment, the analytic server may indicate that the geolocation has not been spoofed. If the geolocation does not match with the signal environment, the analytic server may indicate that the geolocation may be spoofed. A second form of attack may spoof the missing electronic device's geolocation and its signal environment. To combat this form of attack, the analytic server may analyze signal environments observed by other observer devices at the location reported by an observer device in proximity to the missing electronic device or the missing electronic device itself. If there is a match between the received signal environments, the analytic server may indicate that the signal environment has not been spoofed. In some embodiments, the analytic server may determine whether the other observer devices have received wireless signals transmitted by the missing electronic device. If the other observer device report that they have received the wireless signals transmitted by the missing electronic device, the analytic server may determine signal environment of the missing electronic device has not been spoofed. However, if the other observer devices report that they have not received the wireless signals transmitted by the missing electronic device, the analytic server may determine that the signal environment of the missing electronic device is likely spoofed.

A third form of attack may be advanced spoofing, the analytic server may analyze a historical pattern of the missing electronic device and determine the probability of the lost device being in the current location based on the historical pattern. For example, if a purported location of the lost device is wildly out of its historical pattern, the analytic server may indicate that the location may have been spoofed. As discussed above, the analytic server may have been monitoring each electronic device and keeping track of their signal context and geolocations (if available), before the device is reported missing. To establish the historical pattern, the analytic server may temporarily or retroactively retrieve the relevant historical data. The historical pattern may comprise wireless signals, signal clusters, geolocations (by type of venue or place) of the missing device, type of things the missing device tend to be around at previous time points.

The analytic server may determine a probability of how likely the device is located at the reported current location based on the proximity to historical pattern and how the pattern has changed since the device has been lost. If the probability satisfies a threshold, the analytic server may determine that the reported current location is faked; otherwise, the analytic server may determine that the reported current location is true. In some embodiments, the analytic server may determine the active attackers who report the fake information or who report in a way different from the majority. The analytic server may further exclude such attackers from processing.

The analytic server may execute an artificial intelligence model to determine the active attacks based on the historical pattern. Specifically, the analytic server may apply predictive modeling techniques, including but are not limited to, neural networks (NNs), support vector machine (SVMs), decision trees, linear and logistic regression, clustering, association rules, and scorecards, to learn the patterns hidden in large volumes of historical data.

At step 214, the analytic server may generate a graphical user interface on the electronic client device comprising the location information of the missing device. The location information of the missing device may comprise the geolocation (e.g., latitude longitude coordinates), the business type (e.g., store name), the probability of the location information being fake.

In some embodiments, the analytic server may work with a third-party server, such as a third-party company, to track the locations of devices associated with the third-party company. The analytic server may receive a request from the third-party company to find one of its devices, perform the analysis to determine the device's location, and send the output of the device's location to the third-party company. The third-party company may then generate a graphical user interface via an app from the third-party company on a user's device. In other words, the analytic server may transmit the location information directly to a user's device and display the GUI comprising the location information on the user's device. Alternatively, the analytic server may work with a third-party company, which is in the middle between the analytic server and the user, and transmit the location information to the third-party company.

Figure 3:
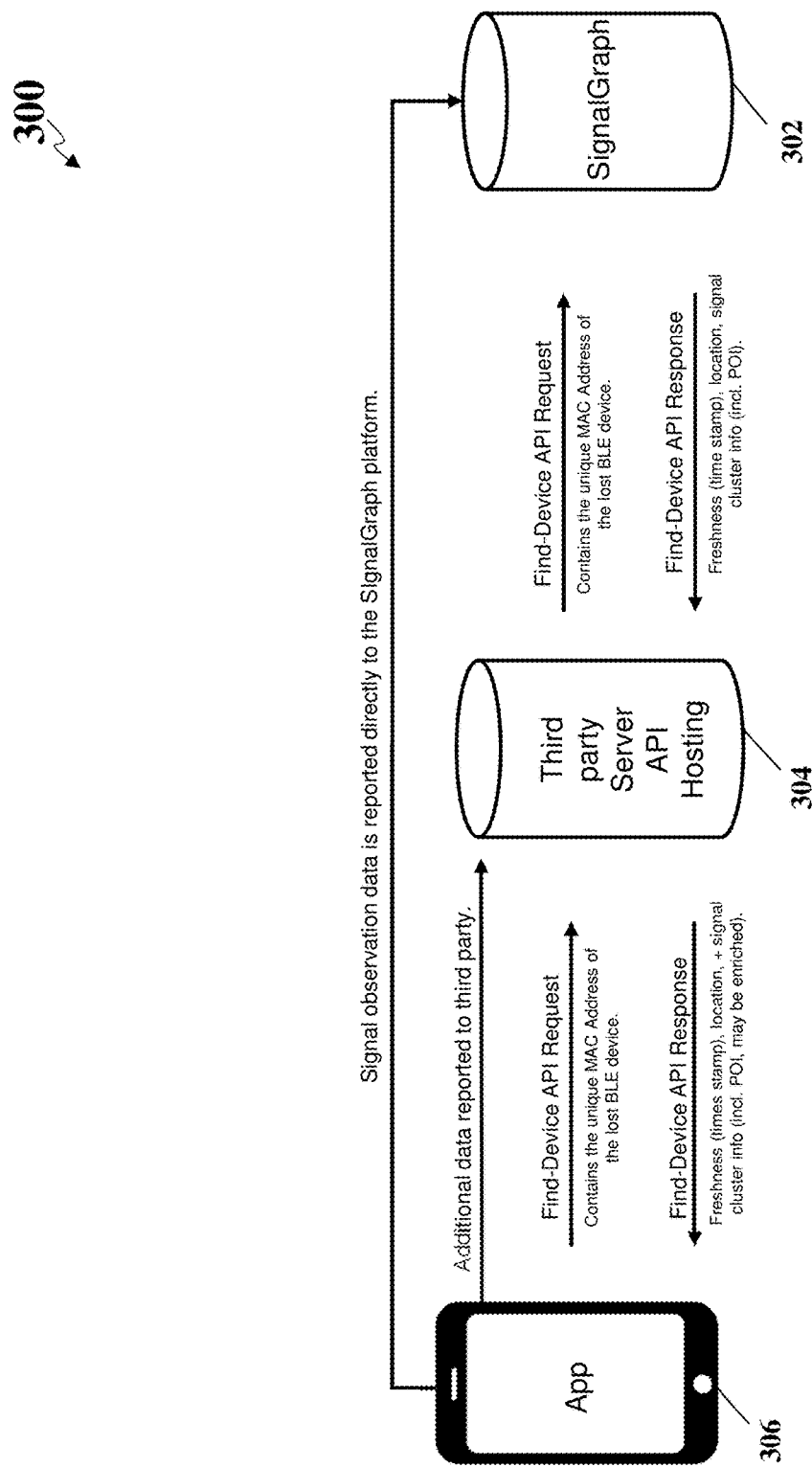
FIG. 3 illustrates an example of system architecture for working with a third party to locate electronic devices, according to an embodiment.

FIG. 3 illustrates an example of system architecture for working with a third party to locate electronic devices, according to an embodiment. In some embodiments, the analytic server 302 may work with a third-party server 304, to locate electronic devices operated by the customers associated with the third-party server. For example, the customers may have their mobile devices 306 installed with an application ("app") containing an SDK and developed by the third-party server. This app may report signal observation data to the analytic server. The signal observation data may comprise signals and observers (e.g., observer devices that observe the signals) at different time points. Based on such signal observation data, the analytic server may build the signal graph and generate hyperclusters. In addition, the app on the mobile devices 306 may report additional data to the third-party server 304. A customer may issue a find-device request to the third-party server 304 via the app on the customer device 306. The request may comprise the unique MAC address of the lost device. After receiving the request from the customer device, the third-party server 304 may issue the same find-device request to the analytic server 302 comprising the MAC address of the lost device. The analytic server 302 may determine the location information of the lost device using methods described above. The analytic server may return the location information to the third-party server 304 as a response. The location information may comprise freshness (e.g., timestamp), location, signal cluster including point of interest around the lost device, and any other relevant information. The third-party server 304 may receive the location information from the analytic server 302, transmit the location information to the customer device 306, and generate a GUI on the customer device to display the location information. In some embodiments, the third-party server 304 may enrich the location information with map data from another server (not shown).

Figure 4:
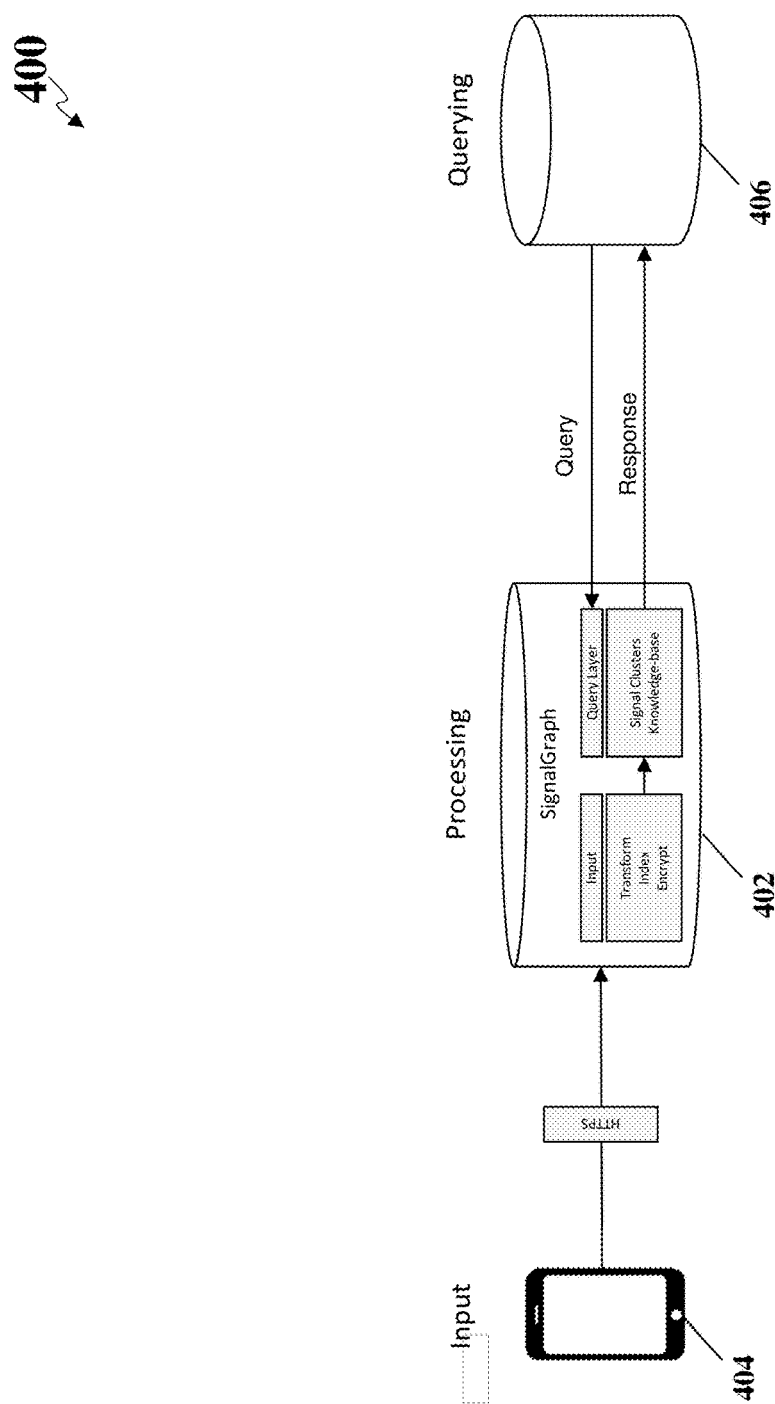
FIG. 4 illustrates a first example of data flows for locating electronic devices, according to an embodiment.

FIG. 4 illustrates a first example of data flows for locating electronic devices, according to an embodiment. The analytic server 402 may receive and collect observation data from mobile devices installed with a third-party app. The mobile devices 404 with the app may be devices operated by customers of the third-party server. The app may comprise observer SDK that collect observations of nearby, detectable Wi-Fi, Bluetooth, and BLE signal information from different devices, such as Wi-Fi hotspots, wearables, and smart-home electronics. The SDK-enabled app on mobile device 404 may report signal observation to the analytic server 402 through Hypertext Transfer Protocol Secure (HTTPS). The analytic server 402 comprising the signal graph platform may transform, encrypt, and index the input signal information (e.g., observations) into a knowledge-base. The analytic server 402 may comprise a query layer that receives a request from the third-party server 406 to find one of its devices. The analytic server may perform the analysis utilizing the combined network input and knowledge-base from the third-party server and other apps of signal clusters to determine the device's location, and send the response of the device's location to the third-party server.

Figure 5:
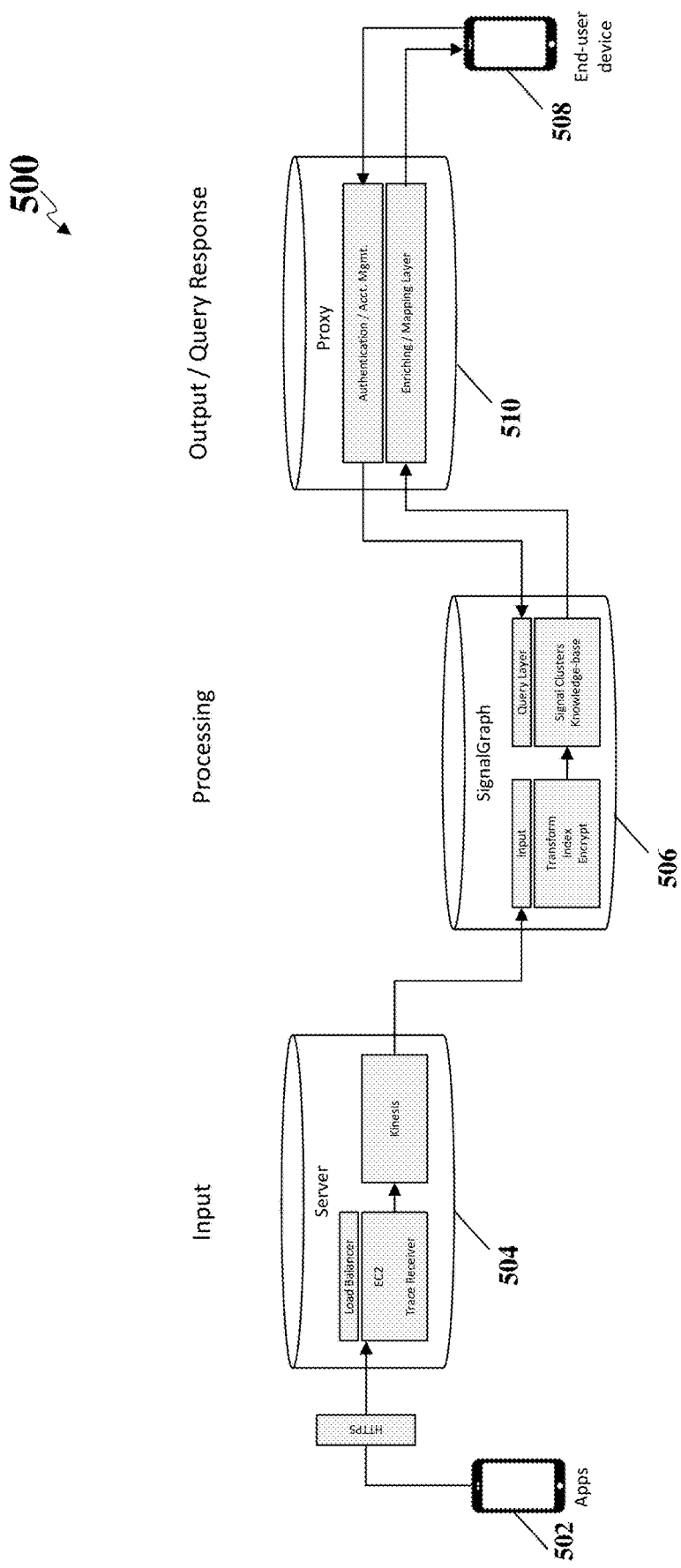
FIG. 5 illustrates a second example of data flows for locating electronic devices, according to an embodiment.

FIG. 5 illustrates a second example of data flows for locating electronic devices, according to an embodiment. A mobile device 502 with a third-party server developed app may collect and report signal information from nearby devices (MACs, SSIDs, UUIDs), along with latitude/longitude and timestamp to a third-party server 504 through HTTPS. The third-party server 504 may validate the input and push all observations into a Kinesis queue. The Kinesis queue may hold observations for a period of time in a first come first out manner. The third-party server 504 may pass the observations (adid of smartphone, MACs, SSIDs, and UUIDs of observed signals, timestamp, latitude/longitude) to the analytic server 506 through an observer application programming interface (API). The analytic server 506 may transform, index, and encrypt the input signal information (e.g., observations) into signal clusters. An OEM (Original Equipment Manufacturer) app end user may input a locate request (e.g., find-device request) on a user device 508. A proxy server 510 may perform request management for account authentication, and forward the request to the analytic server 506. The analytic server 506 may comprise a query layer that receives the request. The analytic server 506 may perform the analysis utilizing the combined network input and knowledge-base from the third-party server and other apps of signal clusters to determine the device's location. The analytic server 506 may return a response comprising freshest signal cluster, location, and timestamp. The proxy server 510 may enrich the response on mapping layer to include enriched location, POI and address information, and return the response to the end user device 508.

The foregoing method descriptions and the process flow diagrams are provided merely as illustrative examples and are not intended to require or imply that the steps of the various embodiments must be performed in the order presented. The steps in the foregoing embodiments may be performed in any order. Words such as "then," "next," etc. are not intended to limit the order of the steps; these words are simply used to guide the reader through the description of the methods. Although process flow diagrams may describe the operations as a sequential process, many of the operations can be performed in parallel or concurrently. In addition, the order of the operations may be re-arranged. A process may correspond to a method, a function, a procedure, a subroutine, a subprogram, and the like. When a process corresponds to a function, the process termination may correspond to a return of the function to a calling function or a main function.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of this disclosure or the claims.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the claimed features or this disclosure. Thus, the operation and behavior of the systems and methods were described without reference to the specific software code being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module, which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the embodiments described herein and variations thereof. Various modifications to these embodiments will be readily apparent to those skilled in the art, and the generic principles defined herein may be applied to other embodiments without departing from the spirit or scope of the subject matter disclosed herein. Thus, the present disclosure is not intended to be limited to the embodiments shown herein but is to be accorded the widest scope consistent with the following claims and the principles and novel features disclosed herein.

While various aspects and embodiments have been disclosed, other aspects and embodiments are contemplated. The various aspects and embodiments disclosed are for purposes of illustration and are not intended to be limiting, with the true scope and spirit being indicated by the following claims.

What is claimed is:

1. A computer implemented method comprising:
receiving, by a server, identification information of a plurality of wireless signals emitted by a plurality of electronic devices and detected by a plurality of observer electronic devices at different time points for a predetermined time window;
generating, by the server, a plurality of proximal groupings of electronic devices based on the spatial proximity and temporal persistence of the plurality of wireless signals, each proximal grouping of electronic devices containing a subset of the plurality of electronic devices;
receiving, by the server, a request to locate a device comprising an identifier of the device;
querying, by the server, a subset of the plurality of observer electronic devices to identify at least one observer electronic device that has detected a wireless signal emitted from the device;

determining, by the server, that the at least one observer electronic device is proximate to at least one proximal grouping of electronic devices of the plurality of proximal groupings of electronic devices;
determining, by the server, a location of the device based on at least one of a location or a semantic resolution of the at least one proximal grouping of electronic devices; and
generating, by the server, a graphical user interface configured to display the location of the device.

2. The method of claim 1, further comprising:
receiving, by the server, geolocation of the at least one observer device;
retrieving, by the server, geolocation of the at least one proximal grouping of electronic devices;
in response to the server determining that the geolocation of the at least one observer device does not match the geolocation of the at least one proximal grouping of the electronic devices:
  generating, by the server, an indication that the geolocation of the at least one observer device is likely spoofed.

3. The method of claim 1, further comprising:
receiving, by the server, geolocation of the at least one observer device;
receiving, by the server from a second observer device at the geolocation of the at least one observer device, a second proximal grouping of electronic devices;
in response to the server determining that the at least one proximal grouping of electronic devices does not match the second proximal grouping of electronic devices:
  generating, by the server, an indication that the at least one proximal grouping of devices is likely spoofed.

4. The method of claim 1, further comprising:
receiving, by the computer, one or more wireless signals observed by a second observer device at the geolocation of the at least one grouping of electronic devices;
in response to determining by the server that the one or more wireless signals do not include the wireless signal emitted from the device:
  generating, by the server, an indication that the at least one proximal grouping of wireless devices is likely spoofed.

5. The method of claim 1, further comprising:
in response to the server determining that the location of the device is not within a historical pattern of locations of the device:
  generating, by the server, an indication that the location of the device is likely spoofed.

6. The method of claim 1, further comprising:
receiving, by the server, the request to locate a device from a third-party server; and
transmitting, by the server, a response comprising the location of the device to the third-party server, wherein the third-party server generates the graphical user interface configured to display the location of the device.

7. The method of claim 1, further comprising:
receiving, by the server, a request to generate a trigger when the device moves out of a designated zone;
monitoring, by the server, the location of the device utilizing one or more proximal groupings of the electronic device including the at least one proximal grouping of electronic devices;
in response to the server determining that a new location of the device is out of the designated zone:
  generating, by the server, an alert to indicate that the device has moved out of the designated zone.

8. The method of claim 1, further comprising:
receiving, by the server, a request to generate a trigger when the device moves from its current location;
monitoring, by the server, the location of the device utilizing one or more proximal groupings of the electronic device including the at least one proximal grouping of electronic devices;
in response to the server determining that the device has moved to new location:
  generating, by the server, an alert to indicate that the device has moved from its current location.

9. The method of claim 1, further comprising:
performing, by the server, resolution to assign semantic meanings to wireless signals of the at least one proximal grouping of electronic devices using classifiers based on SSID, MAC address, and signal graph.

10. The method of claim 1, further comprising:
receiving, by the server, an indication that a mobile software application has been installed on the plurality of observer electronic devices; and
triggering, by the server, a signal scanning function on the plurality of observer electronic devices to cause the plurality of observer electronic devices to detect wireless signals and transmit identification information of the detected signals to the server.

11. A system comprising:
a non-transitory storage medium storing data records associated with a plurality of observer electronic devices;
a server in communication with the plurality of observer electronic devices and configured to:
  receive identification information of a plurality of wireless signals emitted by a plurality of electronic devices and detected by the plurality of observer electronic devices at different time points for a predetermined time window;
  generate a plurality of proximal groupings of electronic devices based on the spatial proximity and temporal persistence of the plurality of wireless signals, each proximal grouping of electronic devices containing a subset of the plurality of electronic devices;
  receive a request to locate a device comprising an identifier of the device;
  query a subset of the plurality of observer electronic devices utilizing the data records stored in the non-transitory storage medium to identify at least one observer electronic device that has detected a wireless signal emitted from the device;
  determine that the at least one observer electronic device is proximate to at least one proximal grouping of electronic devices of the plurality of proximal groupings of electronic devices;
  determine a location of the device based on at least one of a location or a semantic resolution of the at least one proximal grouping of electronic devices; and
  generate a graphical user interface configured to display the location of the device.

12. The system of claim 11, wherein the server is further configured to:
receive geolocation of the at least one observer device;
retrieve geolocation of the at least one proximal grouping of electronic devices;
in response to the server determining that the geolocation of the at least one observer device does not match the geolocation of the at least one proximal grouping of the electronic devices:

generate an indication that the geolocation of the at least one observer device is likely spoofed.

13. The system of claim 11, wherein the server is further configured to:
   receive geolocation of the at least one observer device;
   receive from a second observer device at the geolocation of the at least one observer device, a second proximal grouping of electronic devices;
   in response to the server determining that the at least one proximal grouping of electronic devices does not match the second proximal grouping of electronic devices:
      generate an indication that the at least one proximal grouping of devices is likely spoofed.

14. The system of claim 11, wherein the server is further configured to:
   receive one or more wireless signals observed by a second observer device at the geolocation of the at least one grouping of electronic devices;
   in response to determining by the server that the one or more wireless signals do not include the wireless signal emitted from the device:
      generate an indication that the at least one proximal grouping of wireless devices is likely spoofed.

15. The system of claim 11, wherein the server is further configured to:
   in response to the server determining that the location of the device is not within a historical pattern of locations of the device:
      generate an indication that the location of the device is likely spoofed.

16. The system of claim 11, wherein the server is further configured to:
   receive the request to locate a device from a third-party server; and
   transmit a response comprising the location of the device to the third-party server, wherein the third-party server generates the graphical user interface configured to display the location of the device.

17. The system of claim 11, wherein the server is further configured to:
   receive a request to generate a trigger when the device moves out of a designated zone;
   monitor the location of the device utilizing one or more proximal groupings of the electronic device including the at least one proximal grouping of electronic devices;
   in response to the server determining that a new location of the device is out of the designated zone:
      generate an alert to indicate that the device has moved out of the designated zone.

18. The system of claim 11, wherein the server is further configured to:
   receive a request to generate a trigger when the device moves from its current location;
   monitor the location of the device utilizing one or more proximal groupings of the electronic device including the at least one proximal grouping of electronic devices;
   in response to the server determining that the device has moved to new location:
      generate an alert to indicate that the device has moved from its current location.

19. The system of claim 11, wherein the server is further configured to:
   perform resolution to assign semantic meanings to wireless signals of the at least one proximal grouping of electronic devices using classifiers based on SSID, MAC address, and signal graph.

20. The system of claim 11, wherein the server is further configured to:
   receive an indication that a mobile software application has been installed on the plurality of observer electronic devices; and
   trigger a signal scanning function on the plurality of observer electronic devices to cause the plurality of observer electronic devices to detect wireless signals and transmit identification information of the detected signals to the server.

* * * * *